US008243903B1

(12) United States Patent
Hyndman

(10) Patent No.: US 8,243,903 B1
(45) Date of Patent: Aug. 14, 2012

(54) METHOD AND APPARATUS FOR IMPLEMENTING A SECURE SIDE CONVERSATION ON A TELEPHONE CONFERENCE CALL

(75) Inventor: Arn Hyndman, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 807 days.

(21) Appl. No.: 12/344,474

(22) Filed: Dec. 27, 2008

(51) Int. Cl.
*H04M 3/42* (2006.01)

(52) U.S. Cl. ......... 379/202.01; 379/203.01; 379/204.01; 379/205.01; 379/206.01; 379/207.01; 348/14.08; 348/14.09; 348/14.11; 348/14.12; 709/204; 455/416

(58) Field of Classification Search ............. 379/202.01; 709/204; 348/14.08, 14.09, 14.07; 455/416
See application file for complete search history.

(56) References Cited

U.S. PATENT DOCUMENTS

| 6,772,339 | B1 * | 8/2004 | Jakobsson et al. ............. 713/168 |
| 7,046,779 | B2 * | 5/2006 | Hesse ...................... 379/202.01 |
| 7,302,050 | B1 * | 11/2007 | Michalewicz ........... 379/202.01 |
| 7,362,349 | B2 * | 4/2008 | Nelson et al. ............... 348/14.08 |
| 7,411,939 | B1 * | 8/2008 | Lamb et al. .................... 370/352 |
| 7,894,805 | B2 * | 2/2011 | Joglekar ........................ 455/416 |
| 7,937,270 | B2 * | 5/2011 | Smaragdis et al. ............ 704/256 |
| 2004/0047461 | A1 * | 3/2004 | Weisman et al. ........ 379/202.01 |
| 2005/0275715 | A1 * | 12/2005 | Shingu et al. .............. 348/14.07 |
| 2007/0036279 | A1 * | 2/2007 | Tam et al. ........................ 379/45 |
| 2007/0049261 | A1 * | 3/2007 | Joglekar ........................ 455/416 |
| 2007/0067387 | A1 * | 3/2007 | Jain et al. ....................... 709/204 |
| 2008/0159509 | A1 * | 7/2008 | Whitfield et al. ........ 379/202.01 |

* cited by examiner

*Primary Examiner* — Joseph J Nguyen
(74) *Attorney, Agent, or Firm* — Anderson Gorecki & Manaras, LLP

(57) ABSTRACT

A separate peer-to-peer multi-directional audio channel is established between a subset of the participants to an existing multi-party communication session on the same channel as the original multi-party communication session. Since the secure channel is established on the existing call, the same NAT/firewall traversal mechanisms may be used, and even the same socket may be used. Participants on the secure side conversation can hear both the secure side conversation and the main multi-party communication session. Participants that are not on the secure side conversation may receive packets from the secure side conversation, but are not part of the security association for the secure side conversation and, hence, cannot hear the audio from the secure side conversation.

17 Claims, 3 Drawing Sheets

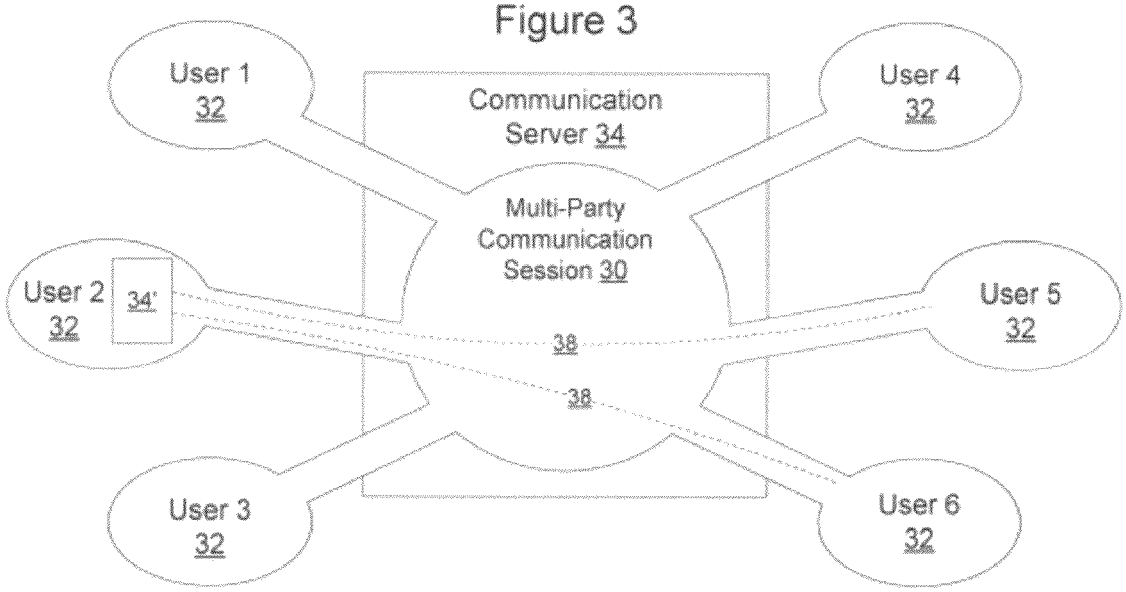
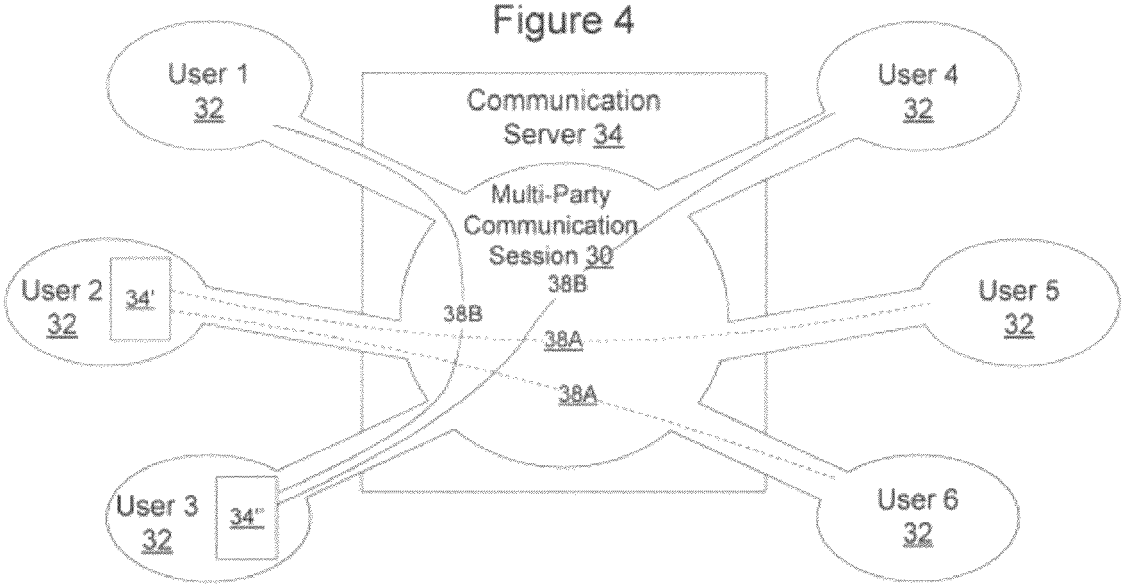

METHOD AND APPARATUS FOR IMPLEMENTING A SECURE SIDE CONVERSATION ON A TELEPHONE CONFERENCE CALL

BACKGROUND OF THE INVENTION

1. Field of the Invention

The present invention relates to communication networks and, more particularly, to a method and apparatus for implementing a secure side conversation on a multi-party communication session.

2. Description of the Related Art

Telephone networks have been in use for many years and have evolved considerably over time. The Public Switched Telephone Network (PSTN) is a circuit network that allows telephone calls to be placed between two or more parties. Voice traffic may also be carried on a data network such as the Internet using a networking protocol commonly referred to as Voice over IP (VoIP). In addition, cellular and other wireless networks have been developed and deployed to allow users to place and receive telephone calls wirelessly. All of these networks, and other private telephone networks, are interconnected to allow individuals on different types of networks to make and receive telephone calls.

As telephone services are developed, they are deployed on the network so that the new services may be sold to customers. For example, telephone conferencing has been developed which allows two or more parties to be interconnected by a bridge. The bridge enables audio from one user to be sent to the other participants to the conference call. Conference telephone calls are commonly used for business meetings, seminars, and for many other purposes to enable multiple people to talk with each other.

Virtual environments are commonly used in on-line gaming, such as for example in online role playing games where users assume the role of a character and take control over most of that character's actions. In addition to games, virtual environments are also being used to simulate real life environments to provide an interface for users that will enable on-line education, training, shopping, business collaboration, and other types of interactions between groups of users and between businesses and users.

When a user participates in a virtual environment, the user can elect to communicate with other users of the virtual environment or may be automatically allowed to talk with other people via the virtual environment. For example, the participants may communicate with each other by typing messages to each other on a chat session, or a voice communication session may be established to enable the participants to talk with each other. Frequently, the voice communication session may be used by many different participants such that the communication session is used by tens or hundreds of users simultaneously.

During a telephone conference, communication session implemented as part of a virtual environment, or other multi-party communication session, audio data is sent to a server, mixed, and then sent out to all participants. Thus, every user can hear every other user or at least a subset of the other users participating on the multi-party communication session. Additionally, during this process, the audio can be recorded by the owner of the server or by any of the other participants without the knowledge of the other participants.

There are times when people on a multi-party communication session may want to be able to talk privately without being overheard or recorded. For example, two people that have established a presence in the virtual environment may want to talk privately with each other rather than on the public multi-party communication session. Although the users may call each other using separate devices, such as by calling each other on their cellular phones, it would be preferable to enable the users to talk with each other privately on the data network. Accordingly, it would be advantageous to provide a method and apparatus that would enable users to implement a secure side conversation on a multi-party communication session.

SUMMARY OF THE INVENTION

A secure side conversation may be established between a subset of the participants to an existing multi-party communication session. Each client to the secure side conversation uses the same voice client for the secure side conversation that they are using for the multi-party communication session. The secure side conversation is routed over the same communication server/path on the network to enable packets for the secure side conversation to traverse through the firewall along with the packets for the multi-party communication session. However, the secure side conversation is implemented using client-to-client SSL to enable only the intended clients to be able to have access to the content of the secure side conversation. Optionally, the secure side conversation may be implemented using the same port as the multi-party communication session. Participants on the secure side conversation can hear both the secure side conversation and the multi-party communication session via their voice clients. The server and other network elements along the data path may receive packets from the secure side conversation, but are not part of the security association for the secure side conversation and, hence, cannot hear the audio from the secure side conversation.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 3 illustrates graphically a multi-party communication session between a group of users, in which a subset of users have implemented a multiparty separate secure side conversation according to an embodiment of the invention;

FIG. 4 illustrates graphically a multi-party communication session between a group of users, in which two subsets of users have implemented multiparty separate secure side conversations according to an embodiment of the invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
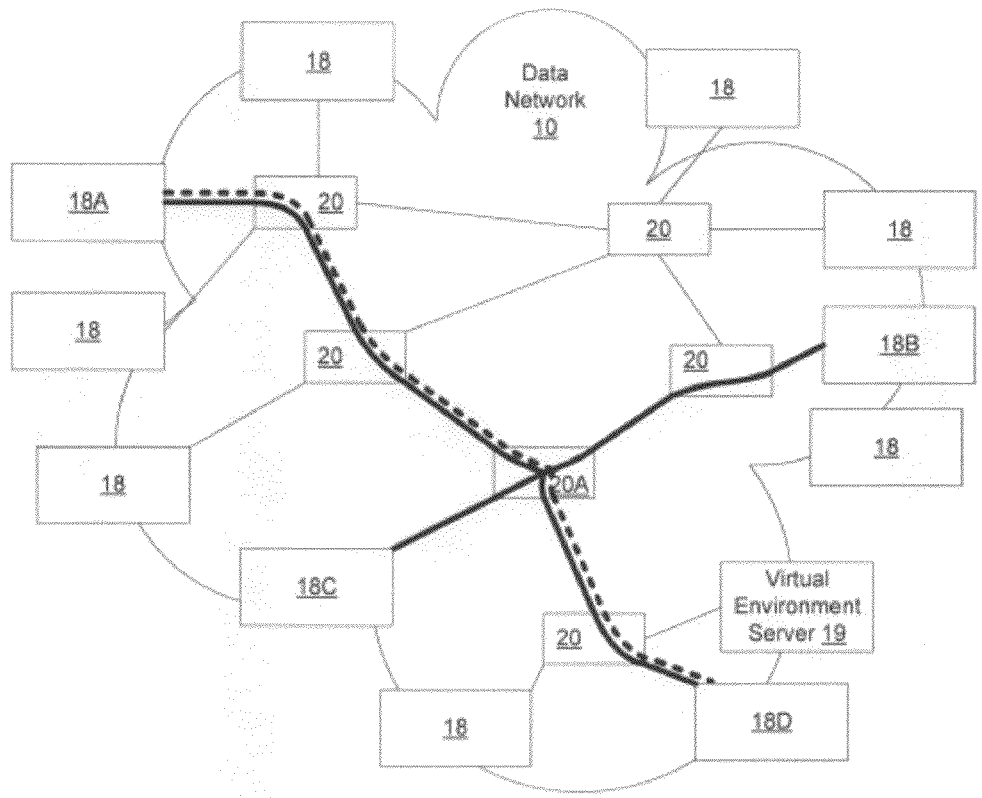
FIG. 1 is a functional block diagram of a reference communication network and shows a multi-party communication session as well as a secure side conversation implemented on the multi-party communication session, according to an embodiment of the invention.

FIG. 1 shows an example data network 10 interconnecting customers 18. The customers 18 may run a communication application on a computer to implement communication sessions on the network 10 or may use a digital telephone such as an IP phone to talk on the network 10. Where the network 10 is an Internet Protocol data network such as the Internet, communication sessions between the users may be implemented using Voice over IP (VoIP).

Where the data network is implemented using another technology, the customers may establish communication sessions using other protocols. There are multiple ways in which customers may establish communication sessions and the invention is not intended to be limited to use with a particular underlying technology.

The customers may interact with each other by logging into a virtual environment and participating in the virtual environment. Generally, a virtual environment is implemented by a virtual environment server 19 connected network 10. Each client that wants to participate in the virtual environment loads a virtual environment client on their local computer. The virtual environment client enables the user to control an Avatar within the virtual environment through which the user can interact with the virtual environment itself, objects within the virtual environment, and other Avatars in the virtual environment.

Many virtual environments enable participants to talk with each other by typing messages to each other. Some virtual environments also provide audio capabilities such that all users within a particular area (volume) of the virtual environment are automatically connected to an audio multi-party communication session. Other virtual environments enable users to manually establish communication sessions with each other to enable multi-party communication sessions to be established via the virtual environment interface.

Within the networks, various network elements 20 are used to allow data to be passed between customers. There are many known network architectures that may be used to implement the underlying networks, and the invention is not limited to any particular architecture. FIG. 1 has shown several network elements 20 in the network 10 interconnected to pass data to each other. The network elements may be implemented in a manner particular to the type of network on which they reside.

FIG. 1 illustrates an example multi-party communication session (solid lines) established between customers 18A, 18B, 18C, and 18D. The multi-party communication session may be hosted by network element 20A implementing a communication server, or may be otherwise implemented depending on the particular way in which the network elements are configured to establish multi-party communication sessions on the network. The invention is not limited to the particular manner in which the communication session is established or how it is implemented on the underlying network elements. For example, the multi-party communication session may be hosted by a communication server instantiated on one or more of the network elements 20 of FIG. 1.

According to an embodiment of the invention, once a multi-party communication session has been established, two or more of the participants to the multi-party communication session may elect to implement a secure peer-to-peer side conversation on the multi-party communication session. The audio for the secure side conversation is carried on the same route as the multi-party communication session but is secured so that only the participants can hear the audio being exchanged on the secure side conversation. Since the Audio is secured, it will be tunneled through the server hosting the multi-party communication session. The audio received on the secure side conversation can be multiplexed with the audio from the original multi-party communication session audio such that participants in the secure side conversation can hear both the original multi-party communication session audio and the secure side conversation audio.

As shown in FIG. 1, two of the participants to the original multi-party communication session (customers 18A and 18D in this example) may establish a peer-to-peer audio channel referred to herein as a secure side conversation (dashed line). The secure side conversation is implemented by the same end clients as are used to implement the multi-party communication session and is routed over the same communication server on the network. Optionally, the secure side conversation may be established as is part of the original multi-party communication session so that the packets of data that are transmitted over the secure side conversation are treated by the network elements as though they were part of the original multi-party communication session. The peer-to-peer audio channel is secured using SSL by the end participants, however, so that only the peers are able to decipher and understand the audio. The peer-to-peer audio channel is also treated by the end systems as a separate audio channel, so that the end-systems will multiplex the audio from the secure side conversation with the original audio from the original multi-party communication session to enable the two streams of audio to be distinguished even though they are output simultaneously.

There are many ways to establish a security association between a pair of users to enable the users to participate in a secure side conversation. Once the multi-party communication session is established, the peers that would like to engage in a secure side conversation may use Secure Socket Layer (SSL) to prevent other people on the network from accessing the secure side conversation. Alternatively, the secure side conversation may be established at the outset when the multi-party communication session is being established. The invention is not limited to the particular signaling mechanism used to establish the peer-to-peer secure side conversation on the main communication session.

Figure 2:
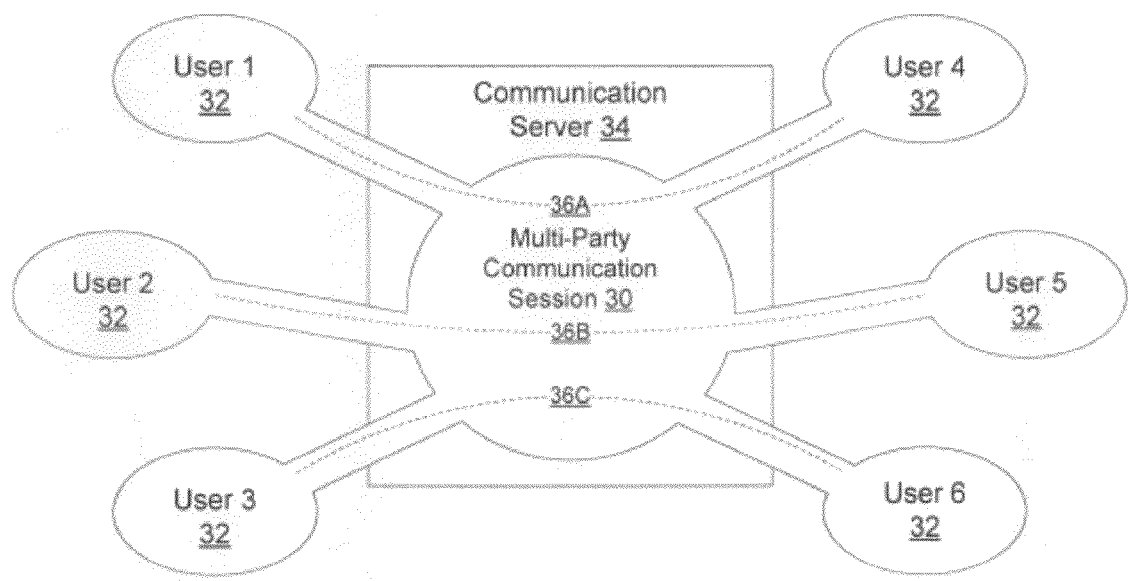
FIG. 2 illustrates graphically a multi-party communication session between a group of users, in which sets of users have implemented multiple secure side conversations according to an embodiment of the invention.

FIG. 2 illustrates graphically how participants to a multi-party communication session may establish peer-to-peer secure side conversations on the original multi-party communication session 30. As shown in FIG. 2, users 32 may join the multi-party communication session and speak with each other over the multi-party communication session. The multi-party communication session will be implemented using a communication server instantiated on an network element on a communication network interconnecting the users. Groups of users may also establish peer-to-peer secure side conversations while remaining on the multi-party communication session. According to an embodiment of the invention, the peer-to-peer secure side conversations are tunneled over the same communication server that is used to host the multi-party communication session. However, each of the secure side conversations extends only between the particular sets of peers and, hence, is not discernable to the communication server 34 or to the other users not part of the secure side conversation.

In the illustrated example, User 1 and User 4 are engaged in a first secure side conversation 36A; User 2 and User 5 are engaged in a second secure side conversation 36B; and User 3 and User 6 are engaged in a third secure side conversation 36C. The secure side conversations are implemented by the same end clients and pass through the same communication server on the network and are used to implement the multi-party communication session 30. Hence, the secure side conversations follow the same network path as the multi-party communication session. Optionally, the secure side conversations may be implemented to on top of the multi-party communication session. The secure side conversations are implemented as secure peer-to-peer audio sessions between participants of the multi-party communication session so that the select sets of users may converse privately while also participating in the multi-party communication session. Although three secure side conversations have been shown in FIG. 2, in theory any number of secure side conversations may be implemented. Similarly, although users are only shown as participating in one extra secure side conversation, the invention is not limited in this manner as a particular user may participate in multiple separate secure side conversations with different users as well.

FIG. 3 shows an example in which one of the users (user 2) has implemented a secondary bridge 34' to be used to enable three or more people to implement a multiparty secure side conversation 38 while still engaged in the multi-party communication session 30. By implementing a bridge 34', three or more users can establish a secondary multi-party communication session between a subgroup of the participants to the main multi-party communication session. The secondary multi-party communication session enables the subgroup of participants (in this case user 2, user 5, and user 6) to discuss privately amongst themselves without enabling the other participants to the multi-party communication session (user 1, user 3, and user 4) from hearing them. The subgroup of participants can still hear whatever audio is being transmitted on the main multi-party communication session 30.

FIG. 4 shows another example in which two sets of participants have each established their own multiparty secure side conversation 38A, 38B, while continuing to participate on the main multi-party communication session 30. Specifically, User 2, User 5, and User 6 have established a secure side conversation 38A, and User 1, User 4, and User 3 have established a second secure side conversation 38B. The second secure side conversation is implemented, in this example, by an audio bridge 34" hosted by User 3. All of the users can hear the audio on the main multi-party communication session 30. However, the users on one of the secure side conversations cannot hear audio from the other secure side conversation. Thus, for example, users on secure side conversation 38A cannot hear audio from secure side conversation 38B and vice versa.

Enabling establishment of multiparty secure side conversations such as shown in FIG. 4 may be useful in particular business transactions. For example, it is not infrequent for two sides to a business transaction to have a large multi-party communication session to try to negotiate particular points of the business transaction. At times, during the negotiation process, one side may want to confer amongst themselves. A multiparty secure side conversation may be set up and used, as necessary, to enable parties from one side of the negotiation to discuss their strategy securely without breaking away from the main multi-party communication session.

The secure side conversations may be implemented using a secure client-to-client tunnel. The tunnel may be implemented using Transport Layer Security, its predecessor Secure Socket Layer (SSL), Secure Real-Time Transport Protocol (SRTP), or other sufficiently robust security technology. TLS and SSL encrypt datagrams at the transport layer (layer 4 of the OSI model). Thus, TLS and SSL enable traffic to be encrypted end-to-end across a communication network. TLS is defined by Internet Engineering Task Force (IETF) Request for Comments (RFC) 5246. SRTP defines a profile of the Real-time Transport Protocol (RTP) which is intended to provide encryption, message authentication and integrity, and replay protection to RTP data. SRTP was first published as IETF RFC 3711. Other end-to-end security protocols may be used to implement peer-to-peer secure side conversations on the main audio multi-party communication session as well.

Figure 5:
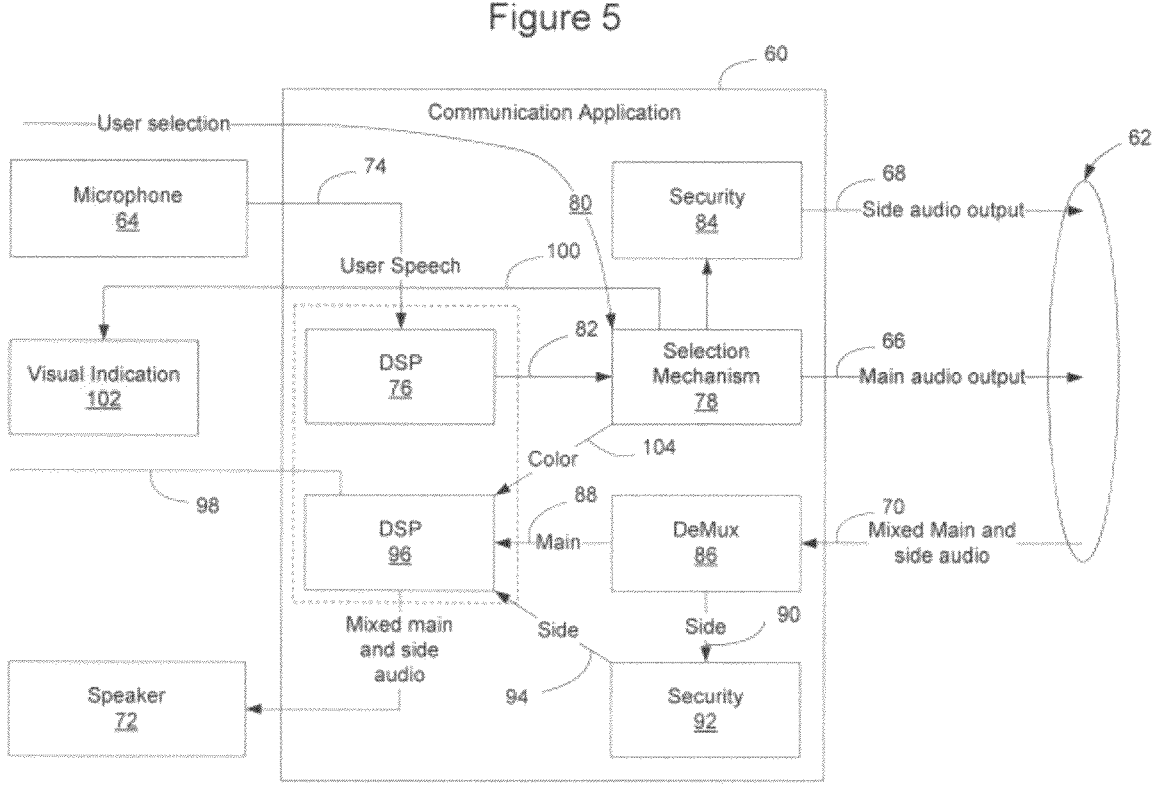
FIG. 5 is a functional block diagram of a mechanism that may enable a user to participate in both a multi-party communication session and a secure side conversation according to an embodiment of the invention.

FIG. 5 shows an example application 60 that may be used to implement an embodiment of the invention. The application may be implemented as one or more processes running in a general purpose computer, digital telephone, or other device capable of handling data communications.

In the embodiment shown in FIG. 5, a user's voice may be detected using microphone 64. Audio from the user will be output on the communication session 62 as either main audio 66 associated with the multiparty communication session or side audio 68 associated with the secure side conversation. In the reverse direction, audio 70 received from the communication session 62 will be presented to the user via speaker 72. The audio 70 that is received from the communication session 62 will be a mixed signal including the main audio from the multi-party communication session and side audio from the secure side conversation.

Within the communication application 60, signals representing the user speech 74 that are received by the application 60 from the microphone 64 will be passed to a processor 76 such as a digital signal processor. The processor will process the user's speech for transmission on the communication session 62. A selection mechanism 78 receives control input 80 from the user to enable the processed user speech signals 82 to be passed onto the communication session 62 as either main audio 66 or side audio 68. If the control signal 80 is set such that the user speech is to be passed out over the main audio stream 66, the selection mechanism will cause the audio to be passed to the multi-party communication session. If, however, the control signal is set to enable the user speech to be transmitted on the secure side communication 68, the selection mechanism 78 will cause the processed audio 82 to be passed to a security process 84, such as a SSL process, so that the audio can be protected before being transmitted on the secure side conversation.

Although not illustrated, the main audio 66 may be protected as well, however the main audio would use an security process separate from that used by the secure side communication. For example, the main audio could use different encryption keys than the secure side conversation so that the secure side audio could not be decrypted by someone having knowledge only about the main audio encryption keys.

The security process 84 in the illustrated embodiment is responsible for engaging in whatever signaling and other key exchange process is required to implement the peer-to-peer end-to-end encryption process. Many different key exchange protocols have been developed and are likely to continue to be developed, and the invention is not limited to the use of a particular security protocol or key exchange protocol. The security process 84 also encrypts data that is to be output on the secure side conversation. Where the main audio stream is to be encrypted, the security process may encrypt the main audio stream using a separate security association. Optionally, the security process 84 and security process 92 discussed below may be implemented using a dedicated hardware encryption/decryption accelerator.

A user will output audio on either the secure side conversation or on the main telephone conference but not both. The user may also mute the microphone so that the user does not provide audio on either output stream.

Since the main audio 66 and the secure side conversation 68 are output and routed through the same communication server, even optionally over the same socket, Network Address Translation (NAT) and firewall penetration are not an issue. Since the end points have established a security association, only the end points that are part of the security association may decipher the side audio output 68. Accordingly, even though the communication server and other people on the multi-party communication session may receive the packets of data containing the audio from the secure side conversation, the other people on the multi-party communication session cannot listen in on the secure side conversation since they are not part of the SSL secure association.

In the reverse direction, when mixed main and side audio 70 is received at the application 60 from the communication session 62, the audio stream 70 will be passed to a demultiplexer 86. The demultiplexer 86 will split the mixed main and side audio stream 70 into its constituent components (main audio stream 88 and encrypted side audio stream 90). The main and side audio streams may be identified by the demultiplexer according to information in packet headers, the position of the packets in the audio stream, or in another manner.

The audio stream for the secure side conversation 90 is passed to a security process 92 which has a security association with the other peer. The security process 92 will use the decryption keys from the security association to decrypt the side audio stream 90 to output decrypted secure side conversation audio stream 94. The main audio stream 88 and the decrypted secure side audio stream 94 are input to a processor 96 such as a digital signal processor where they are mixed and otherwise processed to be output to the speaker 72.

The main audio stream 88 and the decrypted secure side audio stream 94 may be mixed so that the secure side audio stream is overlayed onto the main audio stream. A process for overlaying a secondary audio stream onto a primary audio stream is described in greater detail in U.S. patent application Ser. No. 11/986,005 filed Nov. 19, 2007, entitled *Method and Apparatus for Overlaying Whispered Audio onto a Telephone Call*, the content of which is hereby incorporated herein by reference. Essentially, this process allows a gap to be created in the main audio stream and allows the overlaid audio to be inserted into the gap so that both audio streams are audible and discernable. This result of this mixing is a sort of whispered overlay audio which sounds like someone is whispering or talking while the main audio is being played in the background. Thus, a user may elect to listen to one or the other or both audio streams. Optionally, the user may be allowed to input control signals 98 to the signal processor to control the volume of the main audio, secure side conversation audio, and the manner in which the two are mixed to be output at the speaker 72.

The user may want to know when their voice is being transmitted on the multi-party communication session and when their voice is being transmitted on the secure side conversation. Accordingly, when the user provides input 80 to the selection mechanism 78, the selection mechanism may provide feedback 100 that may be used to cause a visual indication 102 such as a light, graphical icon, or other visual indication to be provided to the user. The selection mechanism may also output a signal 104 to the signal processor 96 to cause the signal processor to color the sound of the main audio or to color the sound of the secure side communication. Coloring of sound depending on the state of the audio channel is described in greater detail in U.S. patent application Ser. No. 12/344,465 filed Dec. 27, 2008, entitled *Method and Apparatus for Providing State Indication on a Telephone Call*, the content of which is hereby incorporated herein by reference. Essentially, coloring of the sound enables the user to be provided with constant feedback as to whether audio generated by the user and detected by the microphone is being output on the main audio channel and heard by everyone on the multi-party communication session, or is being output on the secure side conversation.

Although an embodiment is described in which the communication sessions involve the transmission of audio data, the embodiment may be extended to include other types of data as well, such as video data.

The embodiment shown in FIG. 5 may be implemented by one or more processors running embedded code or software containing control logic to implement the functions described above. Thus, it should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

It will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing a secure side conversation on a multi-party communication session, the method comprising the steps of:

receiving an output audio stream associated with the multi-party communication session during a first period of time and during a second period of time;

receiving first input audio from a user during the first period of time;

receiving a first control input from the user to cause the first input audio to be transmitted from a communication client associated with the user on the secure side conversation for the first period of time;

receiving second input audio from the user during a second period of time;

receiving a second control input from the user to cause the second input audio to be transmitted from the communication client on the multi-party communication session for the second period of time; and during the first period of time while the first input audio is transmitted on the secure side conversation, securing the first input audio before transmitting the first input audio on the secure side conversation so that the first input audio cannot be heard on the multi-party communication session during the first period of time;

wherein the step of receiving an output audio stream comprises the steps of receiving mixed audio including first audio from the multi-party communication session and second audio from the secure side conversation, and providing both the first audio and second audio to the user.

2. The method of claim 1, wherein the multi-party communication session is a telephone conference call.

3. The method of claim 1, wherein the multi-party communication session is a communication session implemented in a virtual environment.

4. The method of claim 1, wherein the step of securing the input audio comprises implementing a secure client-to-client tunnel for the secure side conversation.

5. The method of claim 4, wherein the secure client-to-client tunnel is implemented using Transport Layer Security (TLS).

6. The method of claim 4, wherein the secure client-to-client tunnel is implemented using Secure Socket Layer (SSL).

7. The method of claim 4, wherein the secure client-to-client tunnel is implemented using Secure Real-Time Transport Protocol (SRTP).

8. The method of claim 1, further comprising the step of providing the user with feedback as to whether the first input audio from the user is being transmitted from the communication client on the secure side conversation or is being transmitted from the communication client on the multi-party communication session.

9. The method of claim 8, wherein the feedback comprises a visual indication.

10. The method of claim 8, wherein the feedback comprises alteration of audio played to the user.

11. The method of claim 1, wherein the step of providing both the first audio and the second audio to the user comprises playing the first audio and playing the second audio as an overlay to the first audio.

12. The method of claim 1, further comprising the step of decrypting the second audio.

13. The method of claim 1, wherein the multi-party communication session is hosted by a communication server function on a communication network; and wherein the secure side conversation is hosted by separate trusted communication server function.

14. The method of claim 13, wherein the separate trusted communication server function is hosted by the communication client.

15. The method of claim 1, wherein the secure side conversation shares a data path with the multi-party communication session.

16. The method of claim 15, wherein the secure side conversation and the multi-party communication session share a socket.

17. An audio client, comprising:

a processor to receive user audio input;

a selection mechanism to enable the user to direct the user audio input to be output on a multi-party communication session during a first period of time and to enable the user to direct the user audio input to be output on a simultaneously extant secure side conversation during a second period of time;

a multiplexor to receive mixed audio including both first audio from the multi-party communication session and second audio from the simultaneously extant secure side conversation during both the first period of time and the second period of time; and a processor to simultaneously output both the first audio and second audio to the user during both the first period of time and the second period of time;

wherein the step of receiving an output audio stream comprises the steps of receiving mixed audio including first audio from the multi-party communication session and second audio from the secure side conversation, and providing both the first audio and second audio to the user.

\* \* \* \* \*